(12) United States Patent
Nachum et al.

(10) Patent No.: US 9,749,239 B2
(45) Date of Patent: *Aug. 29, 2017

(54) TRANSPARENT RBRIDGE

(71) Applicant: MARVELL ISRAEL (M.I.S.L) LTD., Yokneam (IL)

(72) Inventors: Youval Nachum, Holon (IL); Tal Mizrahi, Haifa (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,474

(22) Filed: Feb. 8, 2016

(65) Prior Publication Data

US 2016/0156554 A1 Jun. 2, 2016

Related U.S. Application Data

(63) Continuation of application No. 13/857,021, filed on Apr. 4, 2013, now Pat. No. 9,270,589.

(60) Provisional application No. 61/645,544, filed on May 10, 2012, provisional application No. 61/620,337, filed on Apr. 4, 2012.

(51) Int. Cl.
H04L 12/741 (2013.01)
H04L 12/721 (2013.01)
H04L 12/46 (2006.01)
H04L 12/715 (2013.01)

(52) U.S. Cl.
CPC .......... H04L 45/74 (2013.01); H04L 12/4633 (2013.01); H04L 12/4641 (2013.01); H04L 45/64 (2013.01); H04L 45/66 (2013.01)

(58) Field of Classification Search
None
See application file for complete search history.

(56) References Cited

U.S. PATENT DOCUMENTS

| 7,787,480 | B1* | 8/2010 | Mehta | H04L 12/465 370/401 |
| 8,601,133 | B1* | 12/2013 | Rainovic | H04L 12/4633 709/227 |
| 8,634,308 | B2* | 1/2014 | Vobbilisetty | H04L 43/0811 370/241.1 |
| 2008/0101343 | A1* | 5/2008 | Monette | H04L 12/4641 370/352 |

(Continued)

OTHER PUBLICATIONS

IEEE SA-802.1ad-2005—IEEE Standard for Local and Metropolitan Area Networks, "Virtual Bridged Local Area Networks, Amendment 4: Provider Bridges", IEEE Computer Society.

(Continued)

Primary Examiner — Andrew Lai
Assistant Examiner — Jamaal Henson

(57) ABSTRACT

A network edge bridge including a first communication unit configured to receive a data packet from an access segment of a network, the data packet including a tunnel destination address and at least one Virtual Local Area Network (VLAN) tag, a tunnel header constructing unit configured to construct a tunnel header based on the VLAN tag. And a second communication unit that transmits the data packet, including the tunnel header, to an egress device corresponding to the tunnel destination address via an overlay interconnection layer.

12 Claims, 6 Drawing Sheets

(56) References Cited

U.S. PATENT DOCUMENTS

| | | | |
|---|---|---|---|
| 2010/0165995 A1* | 7/2010 | Mehta | H04L 12/462 370/400 |
| 2011/0299406 A1 | 12/2011 | Vobbilisetty | |
| 2011/0299531 A1 | 12/2011 | Yu | |
| 2012/0014261 A1 | 1/2012 | Salam | |
| 2012/0014387 A1* | 1/2012 | Dunbar | H04L 12/4625 370/395.53 |
| 2012/0177045 A1* | 7/2012 | Berman | H04L 12/4633 370/392 |
| 2012/0243539 A1* | 9/2012 | Keesara | H04L 45/66 370/392 |
| 2012/0278804 A1* | 11/2012 | Narayanasamy | G06F 9/45558 718/1 |

OTHER PUBLICATIONS

RFC 6325—Routing Bridges (RBridges) Base Protocol Specification.

* cited by examiner

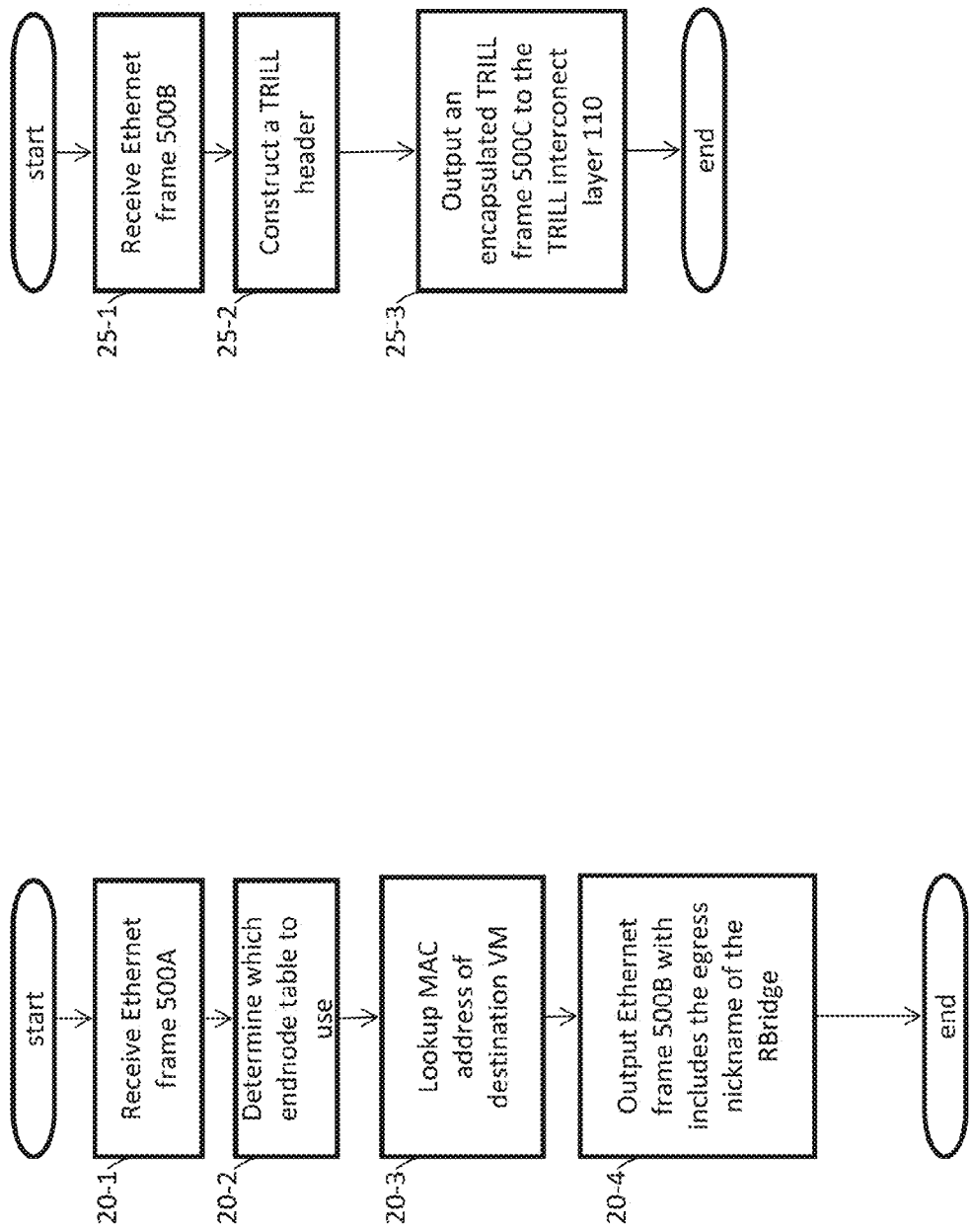

TRANSPARENT RBRIDGE

CROSS-REFERENCE TO RELATED APPLICATIONS

The present disclosure is a continuation application of U.S. application Ser. No. 13/857,021, filed Apr. 4, 2013, which claims priority from provisional application Ser. No. 61/620,337, filed on Apr. 4, 2012, and from provisional application Ser. No. 61/645,544, filed on May 10, 2012. The disclosures of these provisional applications are incorporated herein in their entirety by reference. Further the disclosure of U.S. Publication Ser. No. 13/717,095 filed on Dec. 17, 2012, is incorporated herein in its entirety by reference.

BACKGROUND

Field

The current disclosure relates to computer networking, including, without limitation, computer networking devices configured to operate in Transparent Interconnection of Lots of Links (TRILL) compliant networks.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

TRILL is a standardized protocol to perform bridging using IS-IS (Intermediate System to Intermediate System) link state routing. An RBridge (Routing Bridge) is a device that implements TRILL and is also known as a "Trill Switch". An RBridge that is attached to an endnode is called an "edge RBridge". An RBridge that exclusively forwards encapsulated frames is known as a "transit RBridge". Conventionally, an ingress edge RBridge encapsulates a native Ethernet packet with a TRILL header, and an egress edge RBridge receives a TRILL-encapsulated packet and removes the TRILL header. To encapsulate, received packets a conventional ingress edge RBridge keeps an "endnode table" also known as a "forwarding table" that includes (Media Access Control (MAC) address, TRILL egress switch nickname) pairs, for those MAC addresses currently communicating with endnodes to which the ingress edge RBridge is attached.

If the ingress edge RBridge has many attached endnodes, the endnode table becomes extremely large. Also, if one of the MAC addresses in the table has moved to a different egress edge RBridge, it is difficult for the ingress edge RBridge to quickly notice movement. As a result traffic will get lost because the ingress edge RBridge tunnels to the incorrect egress edge RBridge.

SUMMARY

Some transparent RBridges are targeted for massive scaling data centers and define an efficient architecture to transfer Ethernet packets over TRILL networks. According to one or more embodiments of the disclosure, the complexity of data transmissions among Virtual Machines (VMs) over a TRILL compliant network is reduced by scaling down edge RBbridge operation complexity. Specifically, the edge RBridge operation complexity is scaled down by reducing table sizes at the edge RBridge and simplifying VM location, address and labeling architecture. Thus allowing the transparent RBridge to easily interoperate with Ethernet based networks and reducing TRILL encapsulating complexity.

According to one example embodiment, a transparent edge Routing Bridge (RBridge) includes a first communication unit configured to receive a data packet from an access segment of a network, the data packet including an egress device nickname and at least one Virtual Local Area Network (VLAN) tag; a TRansparent Interconnection of Lots of Links (TRILL) header constructing unit configured to construct a TRILL header based on the VLAN tag; and a second communication unit that transmits the data packet, including the TRILL header, to an egress device corresponding to the egress device nickname via a TRILL compliant interconnection layer.

According to another example embodiment, an access segment includes a server defining a first virtual machine; and a hypervisor configured to transmit a network control message requesting location information of a second virtual machine defined at a second server. The location information including an egress device nickname and at least one Virtual Local Area Network (VLAN) tag, to insert the location information corresponding to the second virtual machine into a data packet to be sent from the first virtual machine to the second virtual machine, and to transmit the data packet to an ingress edge Routing Bridge (RBridge) configured to send the data packet to the second server over a TRansparent Interconnection of Lots of Links (TRILL) compliant interconnect layer.

According to another example embodiment, a transparent edge Routing Bridge (RBridge) includes a first communication unit configured to receive a data packet designating at least one Virtual Local Area Network (VLAN) tag in an Ethernet header, the at least one VLAN tag being either a single VLAN tag or a double VLAN tag, corresponding to a destination virtual machine in a server, the transparent edge RBridge executing a lookup on the at least one VLAN tag to determine a nickname of an egress device and a VLAN associated with the egress device; a TRansparent Interconnection of Lots of Links (TRILL) header constructing unit that constructs a TRILL header by appending the egress device nickname to the data packet; and a second communication unit that transmits the data packet, including the TRILL header, to a TRILL compliant interconnection layer.

According to another example embodiment, a method for forwarding packets on a TRansparent Interconnection of Lots of Links (TRILL) compliant network includes receiving, at an edge Routing Bridge (RBridge) located at an interface between a first access segment and a TRILL compliant interconnecting layer, a data packet including an egress device nickname and at least one Virtual Local Area Network (VLAN) tag; constructing, as executed by a processor of the edge RBridge, a TRILL header based on the egress device nickname and the at least one VLAN tag; determining a next hop device for the transmitting the data packet; and transmitting the data packet, including the TRILL header, through a TRILL compliant interconnect layer to the next hop device.

According to another example embodiment, a method for transmitting a data packet on a TRansparent Interconnection of Lots of Links (TRILL) compliant network includes in a first access segment of the TRILL compliant network, defining a first hypervisor and a first virtual machine; transmitting, from the first hypervisor, a network control message requesting to receive location information of a second virtual machine defined at a second access segment of the TRILL compliant network, the location information including a nickname for an egress device associated with the second access segment and at least one Virtual Local Area Network (VLAN) tag; inserting, as executed by a processor of the first access segment, the location information received in response to the control message into an Ethernet packet to be sent from the first virtual machine to the second virtual machine; and providing the Ethernet packet from the first access segment to an ingress edge Routing Bridge (RBridge) located at an interface between the first access segment and an interconnect layer of the TRILL compliant network. In another example embodiment, a method for forwarding packets on a TRansparent Interconnection of Lots of Links (TRILL) compliant network includes receiving, at a first edge Routing Bridge (RBridge) located at an interface between a first access segment and an interconnecting layer of the TRILL compliant network, a data packet designating either a single Virtual Local Area Network (VLAN) tag or a double VLAN tag in an Ethernet header, the single or double VLAN tag corresponding to a virtual machine defined in a second access segment of the TRILL compliant network; executing, via a processor of the first edge RBridge, a lookup using at least the single or double VLAN tag to determine an egress device nickname and at least one VLAN tag corresponding to a second edge RBridge associated with the second access segment; and appending a TRILL header to the data packet, the TRILL header including the egress device nickname and the at least one VLAN tag.

DRAWINGS

FIG. 3A shows a flowchart of operations of the hypervisor in some example embodiments;

FIG. 3B shows a flowchart of operations of the ingress edge RBridge in some example embodiments;

DETAILED DESCRIPTION

Figure 1:
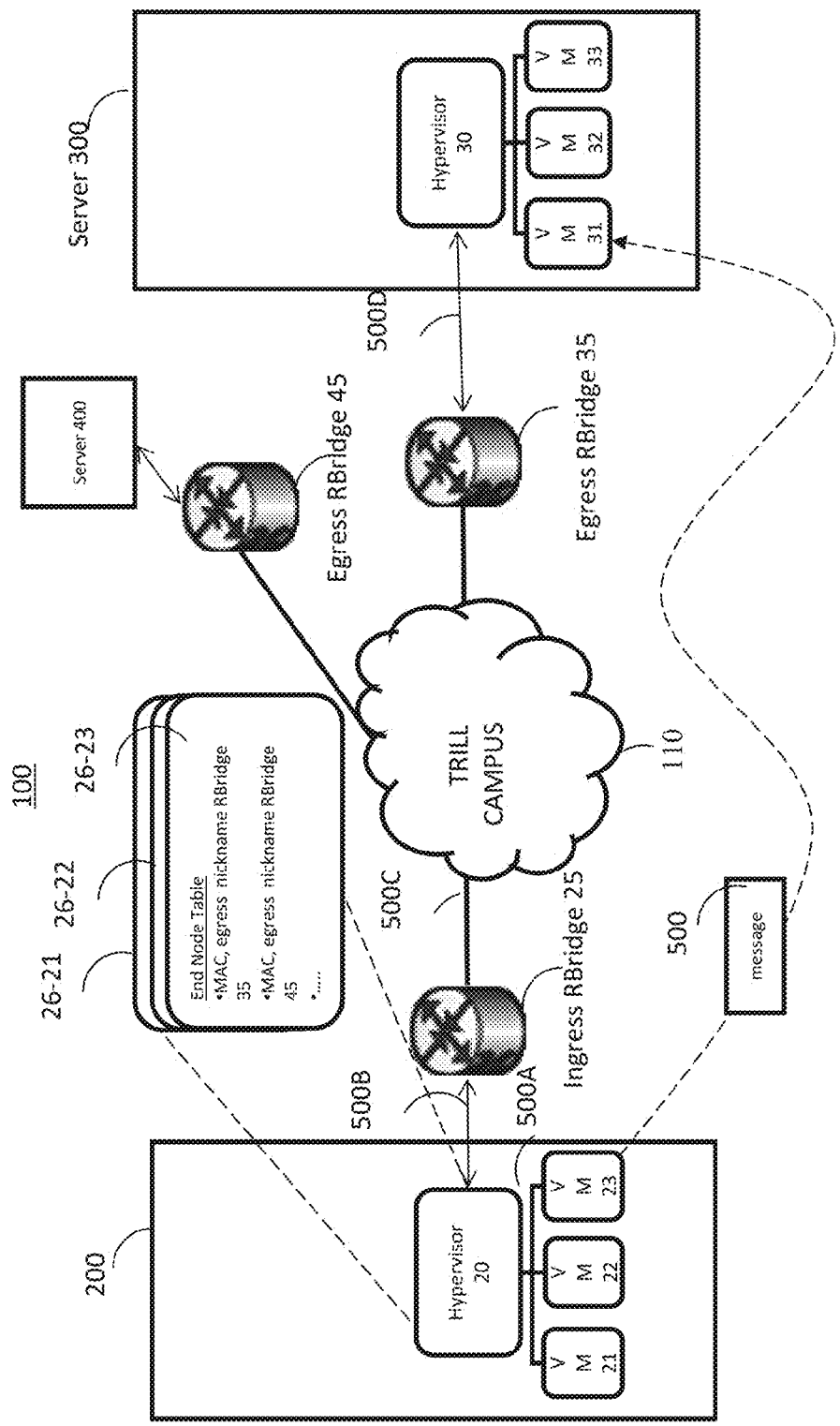
FIG. 1 shows a TRILL compliant network 100 according to an embodiment of the present disclosure.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

As discussed above, in conventional systems, the ingress edge RBridge encapsulates a native Ethernet packet with a TRILL header and the egress edge RBridge then receives a TRILL-encapsulated packet and removes the TRILL header. In order to encapsulate the native Ethernet packet with a TRILL header, traditionally the ingress edge RBridge must keep an "endnode table" including (Media Access Control (MAC) address, egress RBridge nickname) pairs, for those MAC addresses or nodes currently communicating with endnodes to which the edge RBridge is attached. The conventional ingress edge RBridge has a TRILL header constructing unit that constructs a TRILL header or frame based on information looked up in the endnode table of the ingress edge RBridge. Therefore, in order to construct a TRILL header, a conventional ingress edge RBridge must keep track of VM location and labeling (native Virtual Local Area Network (VLAN) or Fine Grained Label (FGL), and MAC address fixed or translated) via the endnode table. If the ingress edge RBridge has many attached endnodes, the endnode table becomes extremely large.

In contrast to the above-mentioned conventional systems, according to one or more embodiments of the present disclosure, endnode table describing the VM location and labeling (Native VLAN (or FGL) and MAC address fixed or translated) is distributed from the ingress edge RBridge to the endnodes (for example, VMs or the hypervisors). In other words, the endnode (for example, a VM or a hypervisor) maintains the endnode table for nodes with which that endnode is communicating. As a result, the edge RBridge complexity is greatly simplified and there is no longer a requirement for the ingress edge RBridge to perform a conventional MAC address lookup. In other words, the ingress edge RBridge according to one or more example embodiments of the present disclosure is not required to know about the nodes with which a particular endnode is communicating, thereby reducing the size of a table at the edge RBridge.

The edge RBridges in the present disclosure can generally be considered somewhat similar to conventional transit RBridges in that they are not required to maintain endnode tables. This is because unlike conventional systems, the endnodes of one or more example embodiments of the present disclosure maintain the endnode table(s). However, unlike conventional transit RBridges and similar to conventional edge RBridges, the edge RBridges of one or more example embodiments include a TRILL header construction unit that constructs TRILL headers from Ethernet frames transmitted from an endnode. Since these Ethernet frames already include the egress device nickname and a VLAN tag (or double VLAN tag as defined at 802.1ad in the case of FGL), the ingress RBridge simply encapsulates the Ethernet frame with a TRILL header and transmits the TRILL encapsulated Ethernet frame to the TRILL compliant interconnection layer.

FIG. 1 shows a TRILL compliant network 100 according to an embodiment of the present disclosure. The TRILL compliant network 100 includes a plurality of endnodes (for example servers 200, 300, 400, hypervisors 20, 30, virtual machines 21, 22, 23, 31, 32, 33, etc., which are shown for illustrative purposes). At the edge of each server is located a transparent edge RBridge (referred to herein as an edge RBridge). For instance, FIG. 1 shows that edge RBridge 25 is located at the edge of server 200, that edge RBridge 35 is located at the edge of server 300, and that edge RBridge 45 is located at the edge of server 400. In some example embodiments some or all of the servers include a hypervisor. FIG. 1 shows hypervisors 20, 30 for illustrative purposes. The hypervisor is software, firmware, or hardware associated with the respective server that defines and runs Virtual Machines (VMs), e.g., 21, 22, and 23; and 31, 32, and 33, respectively. The VMs run by a particular server are associated with individual VLANs which may include one or more of traditional 12 bit VLANs and/or 24 bit FGLs. In some example embodiments, some or all of the servers define and run VMs without the use of a hypervisor. Although three VMs are arbitrarily shown as being defined in server 200 and server 300, respectively, more or less VMs may be defined.

The servers 200, 300, and 400 are connected to a TRILL campus 110 also known as TRILL compliant interconnection layer via their respective edge RBridges. The TRILL campus 110 includes an arbitrary number of transit RBridges (not shown) which function to connect the various edge RBridges to one another, in an embodiment.

Figure 5:
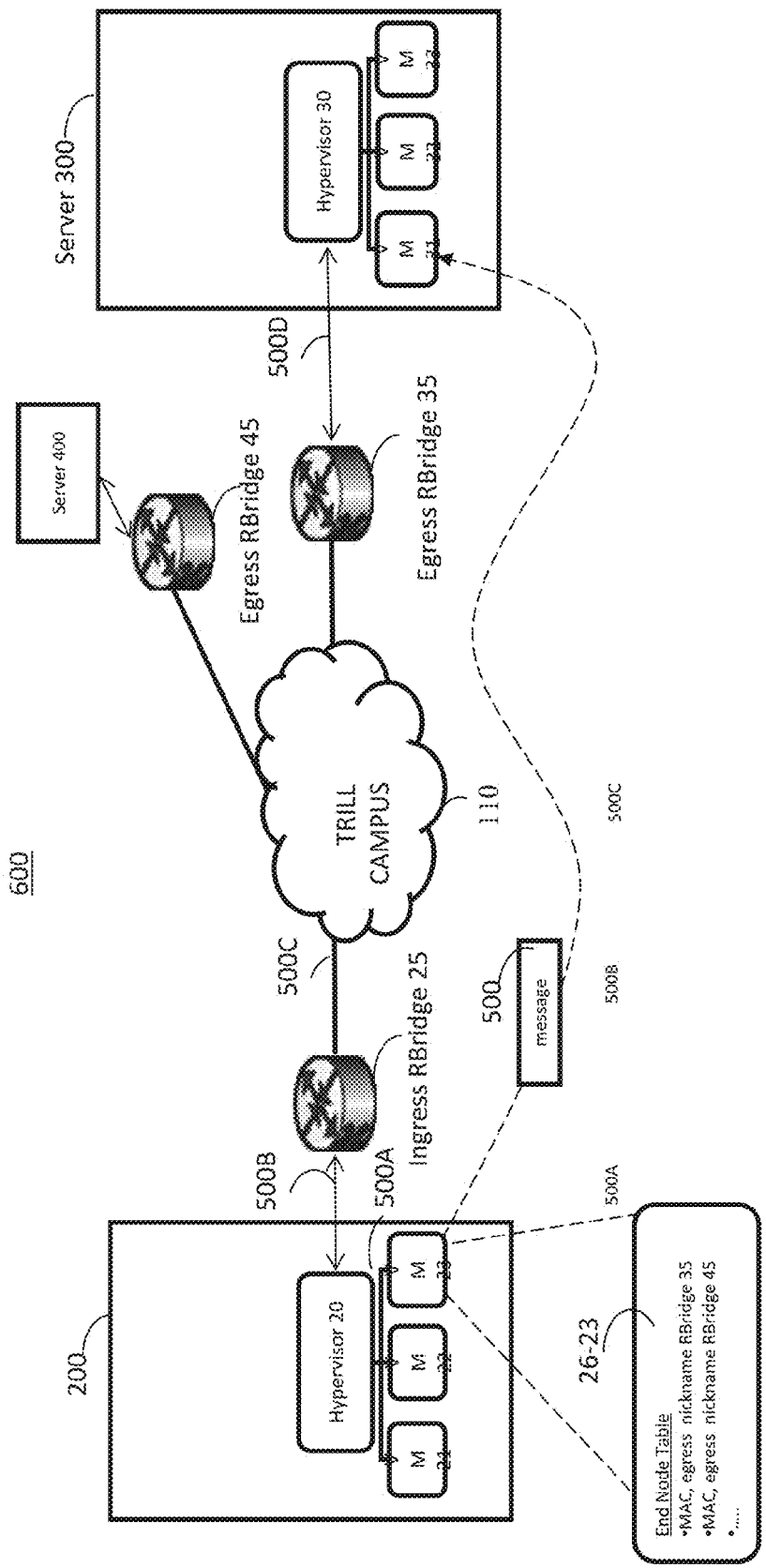
FIG. 5 shows a TRILL compliant network 600 according to another embodiment of the present disclosure.

Referring to FIG. 1, in an embodiment the hypervisor 20 maintains multiple endnode tables 26-21, 26-22, and 26-23, one for each of the attached VMs 21, 22, and 23. The end node tables each include a record of the one or more nodes with which the respective VMs are in communication. It is noted that in other example embodiments (see, e.g., FIG. 5) each VM maintains its own endnode table rather than having the hypervisor 20 maintain the endnode table as described above.

The discussion below describes a case where VM 23 transmits message 500 to VM 31.

Figure 2A:
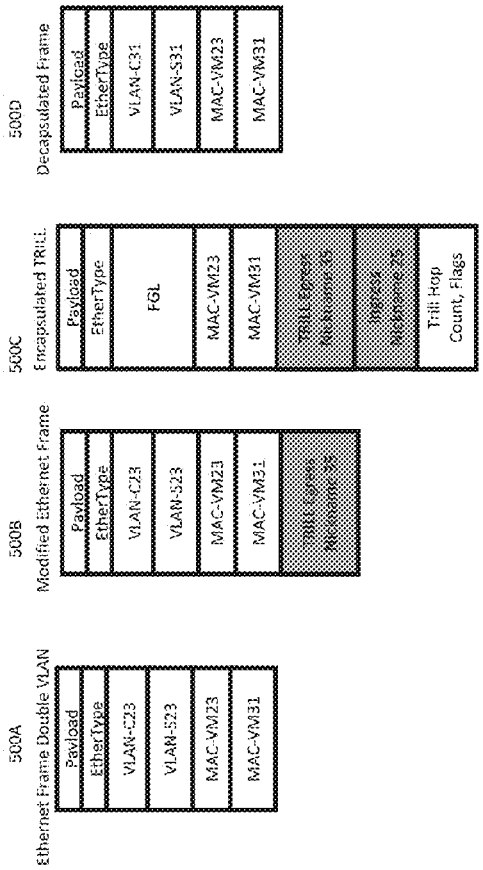
FIGS. 2A and 2B show variations of example messages shown in FIGS. 1 and 5.
Figure 2B:
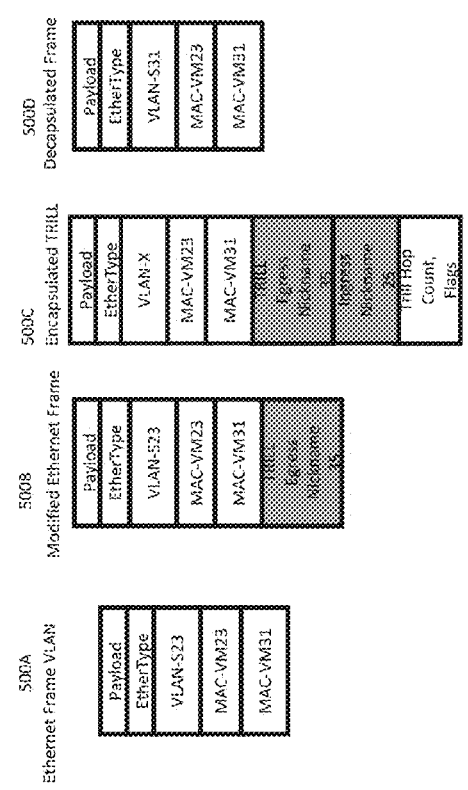

VM 23 originates Ethernet frame 500A. The contents of Ethernet frame 500A are shown in FIGS. 2A and 2B. Specifically, FIG. 2A shows a case where the location information includes a double VLAN tag, the Ethernet frame 500A includes the MAC address of VM31 (MAC-VM31), the MAC address of VM23 (MAC-VM23), the customer VLAN of VM 23 (VLAN-C23) and the service VLAN of VM 23 (VLAN-S23). As shown in FIG. 2B in a case where the location information includes one VLAN tag, the Ethernet frame 500A includes MAC-VM31, MAC-VM23, and the VLAN-S23.

FIG. 3A shows a flowchart describing that the Hypervisor 20 receives Ethernet frame 500A at 20-1, an in an embodiment, determines which endnode table to use by recognizing which VM the Ethernet frame 500A is from at 20-2. In this example, Ethernet frame 500A is determined to be from VM23 as indicated by at least one of VLAN-C23, VLAN-S23, and MAC-VM23 and, therefore, endnode table 26-23 is used. At 20-3, the hypervisor 20 performs a lookup of MAC-VM31 using table 26-23 in order to find the corresponding remote appointed forwarder RBridge which is associated with MAC-VM31. In this case, MAC-VM31 is associated with the egress nickname of edge RBridge 35. Lastly, at 20-4 the Hypervisor 20 outputs Ethernet frame 500B, which includes the egress nickname of RBridge 35 that is associated with VM 31 and either one VLAN tag or a double VLAN tag depending on the particular application.

The ingress RBridge 25 receives the Ethernet frame 500B from Hypervisor 20 and then encapsulates it with a TRILL header so as to be an encapsulated TRILL frame 500C by using the egress device nickname of the egress RBridge 35 and the VLAN tag VLAN-S23 or the double VLAN tag VLAN-C23 and VLAN-S23.

Specifically, FIG. 3B shows that the ingress RBridge 25 receives the Ethernet frame 500B from the Hypervisor 20 at 25-1. The ingress RBridge 25 includes a TRILL header constructing unit (not show) that constructs a TRILL header. At 25-2, the TRILL header constructing unit translates the encoded VLAN tag (VLAN-S23) or the encoded double VLAN tag (VLAN-C23 and VLAN-S23) to the TRILL VLAN-X or TRILL FGL, respectively. At 25-3, the ingress edge RBridge 25 then outputs the encapsulated TRILL frame 500C to the TRILL compliant interconnect layer 110

Based on the disclosure and teachings herein it is noted that the ingress edge RBridge 25 receives the Ethernet frame 500B via a first communication unit (not shown), in an embodiment. In some example embodiments, the first communication unit receives and transmits information while in others the first communication unit only receives information. Similarly, the ingress RBridge 25 then outputs the encapsulated TRILL frame 500C to the TRILL compliant interconnect layer 110 using a second communication unit (not shown). In some example embodiments, the second communication unit receives and transmits information, while in others the second communication unit only transmits information.

As described above, according to one or more example embodiments of the present disclosure, when an Ethernet frame 500B having an egress device nickname and VLAN tag (or double VLAN tag in the case of FGL) is received by the ingress edge RBridge 25, the ingress edge RBridge 25 is configured to simply encapsulate the Ethernet Frame 500B with a TRILL header using information included in the Ethernet frame 500B and then simply forward the TRILL encapsulated Ethernet frame 500C to the edge RBridge 35 whose nickname is in the destination address. In other words, the ingress RBridge 25 does not receive an Ethernet frame with an unknown destination address and therefore there is no need for the ingress RBridge to maintain the above-mentioned large endnode forwarding tables. As a result, the edge RBridges described herein can easily integrate with Ethernet based networks and reduce TRILL encapsulation complexity that would conventionally be performed at an edge RBridge.

It is noted that in some example embodiments the edge RBridges described herein can also support applications where Ethernet frames are encapsulated by Ethernet directly (e.g., with no IP layer).

In some embodiments, for example, where the egress edge RBridge 35 is a conventional egress edge RBridge, when the encapsulated TRILL frame 500C arrives at the egress edge RBridge 35, the egress edge RBridge decapsulates the encapsulated TRILL frame 500C and remaps the VLAN or FGL to the destination VLAN (VM 31, MAC-VM31). In other embodiments, where the egress edge RBridge 35 is a same type of edge RBridge as the above-described ingress edge RBridge 25 and the hypervisor 30 is stores endnode tables in a similar manner as the hypervisor 20, then the egress edge RBridge 35 forwards the encapsulated TRILL frame 500C to the hypervisor 30 and the hypervisor decapsulates the encapsulated TRILL frame 500C and remaps the VLAN or FGL to the destination VLAN (VM 31, MAC-VM31).

Figure 4:
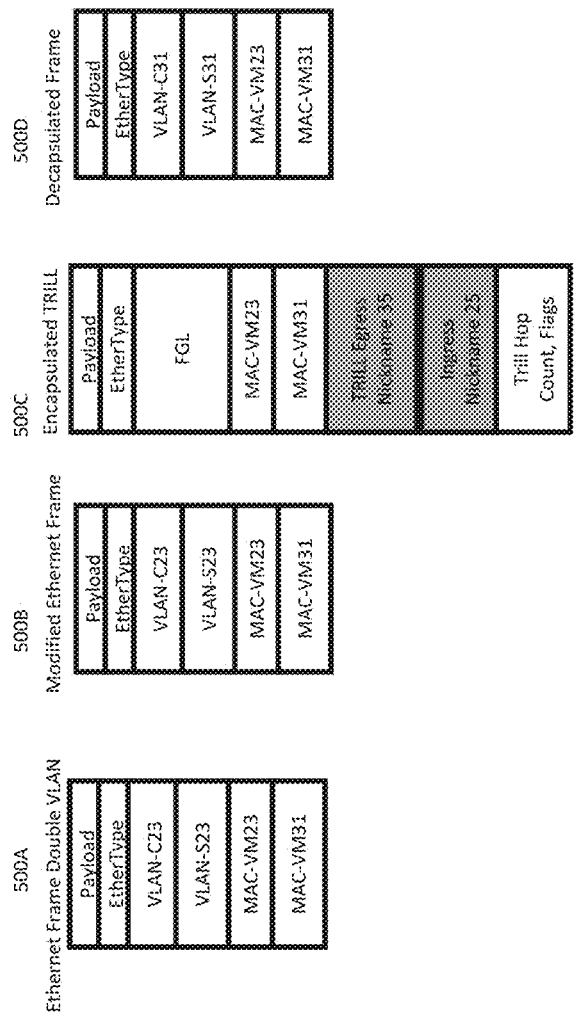
FIG. 4 shows further variations of example messages shown in FIGS. 1 and 5.

In another embodiment, ingress edge RBridge 25 includes a first communication unit, a TRILL header constructing unit, and a second communication unit as discussed above, for example. However, as shown in FIG. 4 the Ethernet frame 500B in the example embodiment designates a single or a double VLAN tag (e.g., here a double VLAN tag) that corresponds to a destination VM (e.g., VM 31) in the server 300. The ingress edge RBridge 25 in this example embodiment executes a lookup on the double VLAN tag to determine a nickname of an egress device and a VLAN associated with the egress device. The ingress edge RBridge 25 executes this lookup, in an embodiment, using a processor (not shown) or the like. The TRILL header constructing unit constructs a TRILL header by appending the egress device nickname 35 to the Ethernet frame 500B and by translating the double VLAN tag (VLAN-C23, VLAN-S23) to FGL.

Since the endnode tables may not always include information for communicating with a particular node, entries in the endnode tables may be resolved by mapping a VM identity (VM-ID) to a remote appointed forwarded RBridge (egress RBridge nickname) with the assigned VLAN tag or double VLAN tag. It is noted that the VM-ID is determined by a higher level (e.g., Internet Protocol (IP) address or Fiber Channel (FC) address of the Destination IDentity (D_ID) of the destination VM and the Source IDentity (S_ID) of the source VM). In the case of using the edge RBridge in an application supporting IP addressing, the hypervisor (or VM) supports an 801.1ad Address Resolution Protocol (ARP) agent, in an embodiment.

The endnode table of the hypervisor (or VM) maps the destination VM-ID to the destination MAC address, and VLAN-Service (VLAN-S) or VLAN-S and VLAN-Customer (VLAN-C). That is, mapping the source VLAN-C to the destination VLAN-C is optional and resolved by IETF TRILL RBridge VLAN mapping techniques. On the other hand, mapping the source VLAN-S is mapped to (VLAN-X (or FGL), egress device nickname), to the destination VLAN-S. This mapping can be resolved in several options.

Figures 6A, 6B:
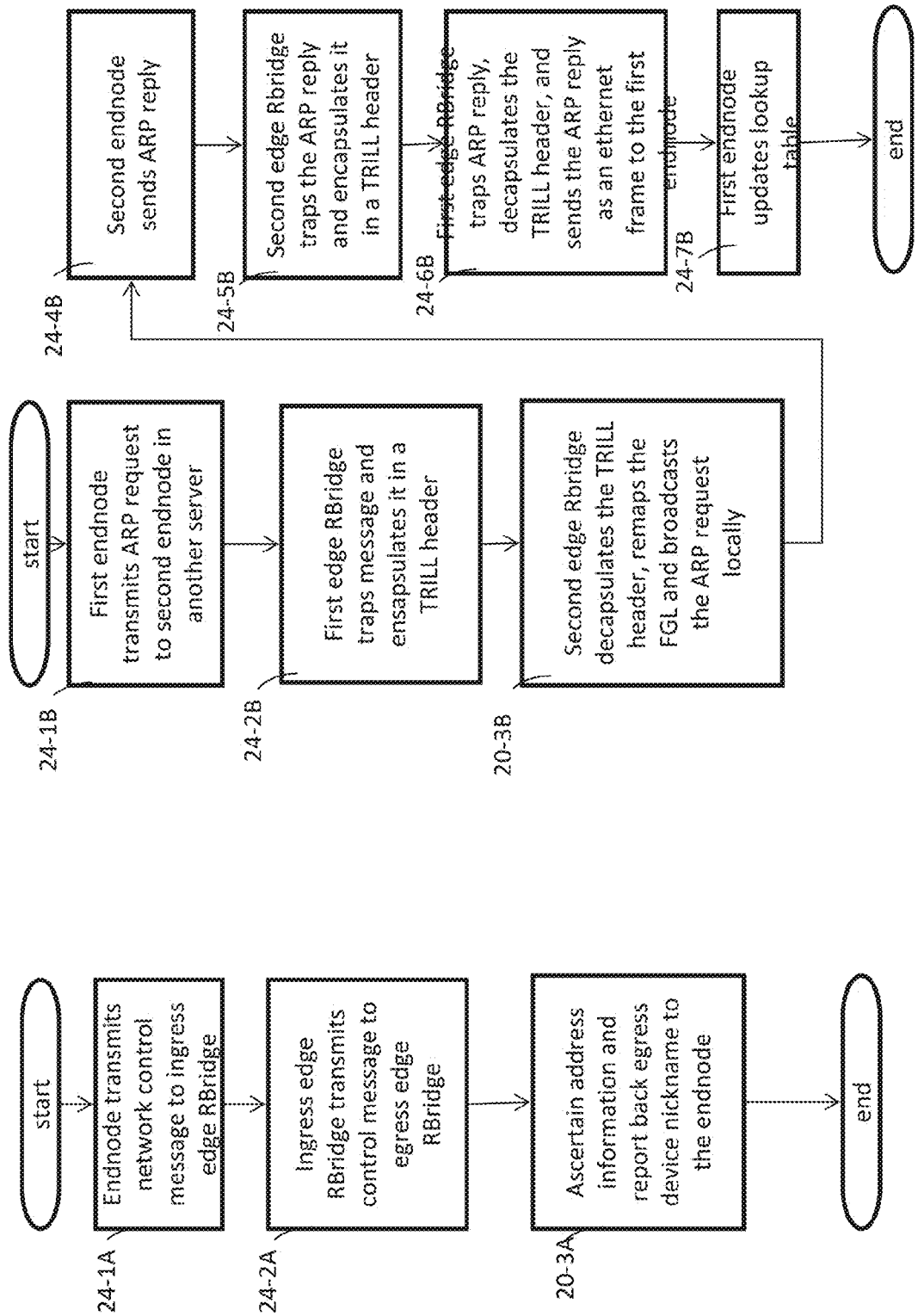
FIGS. 6A and 6B show example operations explaining how the endnode lookup tables of the example embodiments of the present disclosure are updated.

FIG. 6A shows one option which is to have the endnode (Hypervisor 20 or a VM23) transmit a network control message to the ingress edge RBridge 25 at 24-1A. The network control message may be, for instance, an End Station Address Distribution Information (ESADI) message as defined by the ESADI protocol. At 24-2A, the ingress edge RBridge 25 transmits the message to the egress edge RBridge 35 using control plane protocol in order to ascertain the address information and then reports back the egress nickname RBridge to the endnode at 24-3A.

The network control message, however, does not have to be sent according to the ESADI protocol. Therefore, a second option is to have the endnode transmit a network control message that identifies the egress Rbridge and a double VLAN tag. This is because FGL indicates the correct egress RBridge at the transport layer and identifies the VLAN at which the destination VM is located. With this information, the ingress edge RBridge 25 is able to report back the egress nickname RBridge to the endnode. Using this information, the endnode can transmit an Ethernet packet to the ingress edge RBridge 25 that already includes the egress nickname RBridge. As a result, the ingress edge RBridge 25 is not required to keep a forwarding table that includes (MAC address, TRILL egress RBridge nickname) pairs and, therefore, no MAC address lookup in a forwarding table is required.

FIG. 6B shows a third option. In this embodiment, the hypervisor is not required. At 24-1B, the endnode transmits an ARP request to a VM in another server. The ARP request includes a destination VM identity lookup request and an Ethernet frame conforming with 802.1ad and having VLAN-Service (VLAN-S) and VLAN-Customer (VLAN-C). At 24-2B the ingress edge RBridge 25 traps the ARP request and encapsulates it with an encoded FGL in a TRILL header. The ingress edge RBridge 25 transmits this message to the egress edge RBridge. At 24-3B, the egress edge RBridge 35 decapsulates the TRILL header, remaps the FGL and broadcasts the ARP request locally with the Ethernet frame having VLAN-C and VLAN-S. At 24-4B, the second endnode receives the ARP request and sends out an ARP reply as an Ethernet Frame. At 24-5B, the edge RBridge 35 traps the ARP reply for caching and encapsulates the Ethernet frame as a TRILL header, and transmits the ARP reply to the edge RBridge 25. At 24-6, the edge RBridge 25 traps the ARP reply for caching, decapsulates the TRILL header and sends the ARP reply as the Ethernet frame with 802.1ad VLAN-C, VLAN-S to the endnode having transmitted the ARP request at 24-1B. The ARP reply indicating at least a MAC address of the egress RBridge 35. At 24-7B, the VM that sent out the ARP request receives the ARP reply, and then updates a lookup table establishing a correspondence between the double VLAN tag, the egress device nickname of the egress edge RBridge, and the VLAN tag corresponding to the second edge RBridge.

In each case, the ingress edge RBridge 25 reports this information back to endnode (e.g., the hypervisor 20 or the VM23 depending on the particular application), which is able to transmit an Ethernet frame that includes both the egress RBridge nickname and the VLAN tag or double VLAN tag to the ingress RBridge. In other words, the endnode tables may be populated in other ways that are substantially the same way that a conventional edge RBridge populates entries in its tables. For example, by learning from source ingress packets it decapsulates, from End Station Address Distribution Information (ESADI) protocol, by querying a directory, by having some entries configured, by sending a TRILL Hello, etc.

As described above, the endnode (e.g., a VM or a hypervisor) maintains the endnode table, including VLAN data for example, for those nodes with which that endnode is communicating. As a result, the RBridge complexity is greatly simplified and there is no longer a requirement for the ingress edge RBridge 25 to perform a MAC address lookup. Instead, the ingress edge RBridge 25 derives from the VLANs, necessary forwarding information for forwarding packets through the TRILL campus.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward packets, transmit various address resolution messages, update address caches and packet addresses in the manner described in the present disclosure with respect to various embodi-

The invention claimed is:

1. A network edge bridge, comprising:
   a first communication unit configured to receive a data packet from an access segment of a network, the access segment comprising an endnode which comprises one of a hypervisor or a virtual machine that is one hop before the data packet enters a core of the network, the data packet including a tunnel destination address and at least one Virtual Local Area Network (VLAN) tag determined based on a lookup table stored in the endnode;
   a tunnel header constructing unit configured to construct a tunnel header based on the VLAN tag; and
   a second communication unit that transmits the data packet, including the tunnel header, to an egress device corresponding to the tunnel destination address via an overlay interconnection layer.

2. A network access segment comprising:
   a server defining a first virtual machine; and
   a hypervisor configured to transmit a network control message requesting location information of a second virtual machine defined at a second server, the location information including a nickname tunnel destination address and at least one Virtual Local Area Network (VLAN) tag, to insert the location information corresponding to the second virtual machine into a data packet to be sent from the first virtual machine to the second virtual machine, and to transmit the data packet to an ingress edge bridge configured to send the data packet to the second server over a tunnel interconnect layer.

3. The network access segment according to claim 2, wherein the hypervisor is configured to transmit the network control message to the ingress edge bridge.

4. The network access segment according to claim 3, wherein when the ingress edge bridge receives the network control message, the ingress edge bridge determines the location information and reports the location information to the hypervisor.

5. A network edge bridge comprising:
   a first communication unit configured to receive, from an access segment in a network, a data packet designating at least one Virtual Local Area Network (VLAN) tag in an Ethernet header, the access segment comprising an endnode which comprises one of a hypervisor or a virtual machine that is one hop before the data packet enters a core of the network, the at least one VLAN tag being either a single VLAN tag or a double VLAN tag, being determined based on a lookup table stored in the endnode, and corresponding to a destination virtual machine in a server, the network edge bridge executing a lookup on the at least one VLAN tag to determine a tunnel nickname of an egress device and a VLAN associated with the egress device;
   a tunnel header constructing unit that constructs a tunnel header by appending the tunnel nickname of the egress device to the data packet; and
   a second communication unit that transmits the data packet, including the tunnel header, to an overlay interconnection layer.

6. A method for forwarding packets on a tunneling network, the method comprising:
   receiving, at an edge bridge located at an interface between a first access segment and an overlay interconnect layer, a data packet including a tunnel destination address and at least one Virtual Local Area Network (VLAN) tag, the first access segment comprising an endnode which comprises one of a hypervisor or a virtual machine that is one hop before the data packet enters a core of the tunneling network, the at least one VLAN tag being determined based on a lookup table stored in the endnode;
   constructing, as executed by a processor of the edge bridge, a tunnel header based on the tunnel destination address and the at least one VLAN tag;
   determining a next hop device for the transmitting the data packet; and
   transmitting the data packet, including the tunnel header, through the overlay interconnect layer to the next hop device.

7. The method according to claim 6, further comprising:
   transmitting, from the edge device, a network control message requesting to receive location information of a virtual machine defined at a second access segment, the requested location information including the nickname tunnel destination address and the at least one VLAN tag;
   inserting location information, received in response to the request, corresponding to the virtual machine defined at the second access segment into the data packet; and
   transmitting the data packet to the edge bridge.

8. A method for transmitting a data packet on a tunnel network, the method comprising:
   in a first access segment of the tunnel network, defining a first hypervisor and a first virtual machine;
   transmitting, from the first hypervisor, a network control message requesting to receive location information of a second virtual machine defined at a second access segment of the tunnel network, the location information including a name for an egress device associated with the second access segment and at least one Virtual Local Area Network (VLAN) tag;
   inserting, as executed by a processor of the first access segment, the location information received in response to the control message into an Ethernet packet to be sent from the first virtual machine to the second virtual machine; and
   providing the Ethernet packet from the first access segment to an ingress edge bridge located at an interface between the first access segment and an interconnect layer of the tunnel network.

9. The method according to claim 8, wherein the first hypervisor sends a control protocol message structured for exchanging routing information between network devices.

10. A method for forwarding packets on a tunnel network, the method comprising:
   receiving, at a first edge bridge located at an interface between a first access segment and an interconnecting layer of the tunnel network, a data packet designating either a single Virtual Local Area Network (VLAN) tag or a double VLAN tag in an Ethernet header, the single or double VLAN tag corresponding to a virtual machine defined in a second access segment of the tunnel network, the first access segment comprising an endnode which comprises one of a hypervisor or a virtual machine that is one hop before the data packet enters a core of the tunnel network, the single or double VLAN tag being determined based on a lookup table stored in the endnode;
   executing, via a processor of the first edge bridge, a lookup using at least the single or double VLAN tag to determine a nickname tunnel destination address and at least one VLAN tag corresponding to a second edge bridge associated with the second access segment; and appending a tunnel header to the data packet, the tunnel header including the nickname tunnel destination address and the at least one VLAN tag.

11. The method according to claim 10, further comprising forwarding the data packet to a next hop location in the tunnel network using the at least one VLAN tag.

12. The method according to claim 10, further comprising:

forwarding an address resolution message from a first Virtual Machine (VM) defined in the first access segment in order to resolve an address for a second VM located in the second access segment;

trapping, at the first edge bridge, an address resolution response indicating at least a Media Access Control (MAC) address of the second edge bridge associated with the second access segment; and updating, at the first edge bridge and in response to the trapped address resolution response, a lookup table establishing a correspondence between the single or double VLAN tag, the nickname tunnel destination address of the second edge device associated with the second access segment, and the at least one VLAN tag corresponding to the second edge bridge.

* * * * *